(12) United States Patent
Main

(10) Patent No.: US 7,387,237 B2
(45) Date of Patent: Jun. 17, 2008

(54) COMPUTERIZED BANKING DEVICE AND METHOD OF USE

(76) Inventor: Jonathan D. Main, 1305 43rd Ave., Kenosha, WI (US) 53144

( * ) Notice: Subject to any disclaimer, the term of this patent is extended or adjusted under 35 U.S.C. 154(b) by 0 days.

(21) Appl. No.: 11/425,385

(22) Filed: Jun. 20, 2006

(65) Prior Publication Data

US 2007/0290032 A1 Dec. 20, 2007

(51) Int. Cl.
*G07D 11/00* (2006.01)
(52) U.S. Cl. .......................................... 235/379; 446/10
(58) Field of Classification Search ................ 235/379; 434/107, 110; 194/350
See application file for complete search history.

(56) References Cited

U.S. PATENT DOCUMENTS

| | | | | |
|---|---|---|---|---|
| 4,332,348 | A * | 6/1982 | Nordin | 232/43.3 |
| 4,380,316 | A * | 4/1983 | Glinka et al. | 232/16 |
| 4,815,998 | A * | 3/1989 | McGuire | 446/8 |
| 4,910,359 | A * | 3/1990 | Dougherty et al. | 174/69 |
| 5,135,434 | A * | 8/1992 | Mallon | 453/43 |
| 5,252,811 | A * | 10/1993 | Henochowicz et al. | 235/379 |
| 5,716,211 | A * | 2/1998 | Vetter | 434/107 |
| 6,082,519 | A * | 7/2000 | Martin et al. | 194/350 |
| 6,235,990 | B1 * | 5/2001 | Morris et al. | 174/69 |
| 6,318,536 | B1 * | 11/2001 | Korman et al. | 194/217 |
| 6,454,570 | B1 * | 9/2002 | Woods | 434/107 |
| 6,854,640 | B2 * | 2/2005 | Peklo | 235/100 |
| 6,896,573 | B1 * | 5/2005 | Rogers | 446/8 |
| 7,117,173 | B1 * | 10/2006 | Ambani | 705/35 |
| 2003/0191722 | A1 * | 10/2003 | Thompson et al. | 705/66 |
| 2003/0212636 | A1 * | 11/2003 | Resnick | 705/42 |
| 2004/0067469 | A1 * | 4/2004 | Rogan et al. | 434/107 |
| 2005/0069841 | A1 * | 3/2005 | Lee et al. | 434/107 |

* cited by examiner

*Primary Examiner*—Michael G. Lee
*Assistant Examiner*—Paultep Savusdiphol
(74) *Attorney, Agent, or Firm*—White-Welker & Welker, LLC

(57) ABSTRACT

The present invention is banking device that has a slot on the top surface to accept coins and contains therein a locking reservoir for the collection of change. A money sorter is used to count the deposited money. The reservoir is "keyed" and can only be opened by the local bank, where an account is held, or by parents, if the account is held by a minor. At the time of deposit, the electric money sorter, via the computer connection, contacts the local bank's online banking system to process and record the deposits and beings earning interest that is then credited after deposit of money into the bank account. If the reservoir is emptied prior to deposit, credits and interest are lost and can only be resumed after equal deposit is made at the bank.

12 Claims, 10 Drawing Sheets

COMPUTERIZED BANKING DEVICE AND METHOD OF USE

FEDERALLY SPONSORED RESEARCH

Not Applicable

SEQUENCE LISTING OF PROGRAM

Not Applicable

CROSS REFERENCE TO RELATED APPLICATIONS

Not Applicable

TECHNICAL FIELD OF THE INVENTION

The present invention relates generally to a computerized bank. More specifically, the present invention relates to an educational monetary device that also acts as a computerized bank that interacts with an interest bearing, savings, checking, or investment online bank account.

BACKGROUND OF THE INVENTION

The collection of change in "piggy banks" and other coin sorting devices is well known in the prior art and an established practice in many cultures. Coin collecting devices range from a simple jar or box, those with ornamental appearances, and even those with multiple compartments, sorting apparatus and counting means. In most cultures a child's first introduction to money and its value is in the form of collecting change or saving loose change either found or given to them so that a purchase can be made at a later time. This practice has evolved and results in several devices being developed to further enhance a child's learning of the value of money and its various uses, saving, spending, donating, etc.

For example, U.S. Pat. No. 5,716,211 issued to Vetter teaches an educational savings bank and toy is provided that includes a plurality of separate monetary input and storage locations that correspond to different budgetary categories, that automatically calculates an appropriate distribution of funds for each budgetary category based on a preselected percentage of money available to invest, and that automatically calculates the future value of funds in each budgetary category based on a user's age and a preselected time-frame and interest rate appropriate for that budgetary category. Written investment instructions are provided to advise the user on appropriate actual investments for the money totals saved in each category based on the budgetary goal of that category. One embodiment includes a base member with a plurality of representative figures selected to represent each discrete budgetary category and includes a microprocessor that calculates and displays the amounts of an investment total to be allocated to each budgetary, account, and their future values.

U.S. Pat. No. 6,454,570 issued to Woods teaches an educational banking apparatus comprising a compartment for storing money, and aperture to allow money to be deposited into apparatus and an outlet to allow money to be withdrawn from the apparatus, balance determination means for determining the amount of money stored in the apparatus and communication means to allow transmission of balance information over a network to a remote location. The apparatus may be in a form that appeals to children such as a piggy bank and allows a child to save and become familiar with the concept of a bank account without out having to physically part with his or her money.

U.S. Pat. No. 6,976,619 issued to Beacham, et al. discloses a compartmented bank for holding money to be used for saving, spending, donating, investing or other budgetary purposes. The bank is shaped like an animal and comprises a hollow body and four feet. Each compartment communicates with one of the feet so that money deposited into each compartment can be dispensed through an opening in a corresponding foot. The external surface of the body bears indicia indicating the budgetary purpose of the money placed in each compartment.

U.S. Patent Application 20030212636 published on Nov. 13, 2003 discloses an educational interactive money management method for use in an arrangement comprising at least one computer network connecting at least one display device to at least one information-provider computer. The method having the steps of: displaying a graphic user interface connected to an electronically accessible financial account having at least one game; establishing a system of authorization governing access and transfer of information to and from the graphic user interface and the financial account; and processing information and transactions to and from the graphic user interface as permitted by the system of authorization.

One shortcoming of the devices known in the prior art is that they provide little or no means for interactive learning to a child using such devices.

Another shortcoming is that the bank devices known in the prior art are static and not interactive to a learning program or connected to an actual bank account. The combination of an interactive learning interface and connection to an actual bank account enables a new user, such as a child to learn more about the banking system and the value of money while providing exposure to other more complex issues such as the concept of interest.

Yet another shortcoming of the saving devices known in the prior art is that they provide no connection to establish banks and offer no access to potential new customers, the children, and families.

SUMMARY OF THE INVENTION

The present invention is a computerized bank that either uses a standard USB port or wireless network features to connect with a standard computer in the home which provides connectivity to an individual's account at a local bank through the bank's on-line banking system.

The computerized bank is comprised of an ornamental case that has a slot on the top surface to accept coins and contains therein a locking reservoir for the connection of change. An electronic money sorter is used to count the deposited change. The locking reservoir collects the deposited money and is easily removed from the ornamental case of the computerized bank. The reservoir is "keyed" and can only be opened by the local bank, where an account is held, or by parents, if the account is held by a minor. At the time of deposit, the electric money sorter, via the computer connection, contracts the local bank's online banking system to process and record the deposits. If the reservoir is emptied at home prior to deposit with the local bank, credits and interest are lost and can only be resumed after equal deposit is made at the local bank.

Additionally, depending on the amount of the deposit and the age of the depositor, rewards may be earned by the depositor in the forms of playing an educational computer game, the award of household privileges, credits for the download of online music, or any other incentive.

It is an objective of the present invention to provide a computerized banking device that makes it exciting for children to lean to save money and learn more about the value of money while also being introduced to more complex financial issues.

In addition, it is the objective of the present invention to provide a computerized banking device that is adaptable to children of all ages and skill levels with the ability to adapt to a growing child.

It is also an objective of the present invention to provide banks of all sizes with a new customer development program that can assist them in capturing customers at a younger age to develop loyalty. Additionally, banks catering to the development of financial skills in children are also likely to entice parents to move accounts or open new accounts, resulting in an increased exposure to older potential customers who are unlikely to change banks for other reasons.

It is another objective of the present invention to involve the parents in the financial education of their children so that both parent and child can become more aware of the value of money, saving options such as college fund accounts, and have an incentive for prolonged contribution.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention.

Referring to the figures, it is possible to see the various major elements constituting the apparatus of the present invention. The present invention is a computerized banking device 1 consisting of a case 2, money sorter 11, locking money reservoir 10, USB or wireless computer interfacing, computer software means for enabling various computer programs and connection to online banking systems.

Physical Computerized Banking Device

Figure 1:
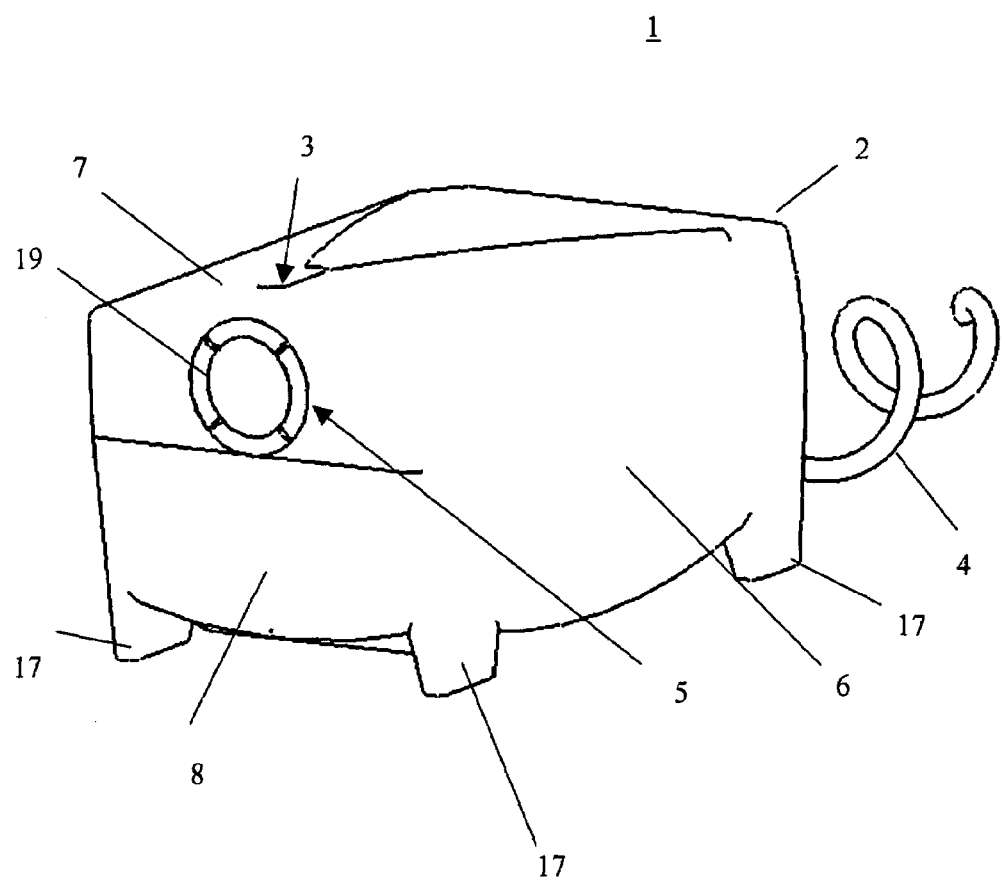
FIG. 1 is a perspective view of the computerized bank of the present invention.

Now referring to FIG. 1, a perspective view of the computerized banking device 1 is illustrated. The ornamental appearance in a preferred embodiment of the computerized bank 1 is designed to elicit the perception by viewers that the case 2 is in the shape of a pig. To accomplish this the case 2 consists of six sides; a top surface 7, two side surfaces 6, a front surface 8, a back surface 18, and a bottom cavity 16 supported by four legs 17.

Figure 2:
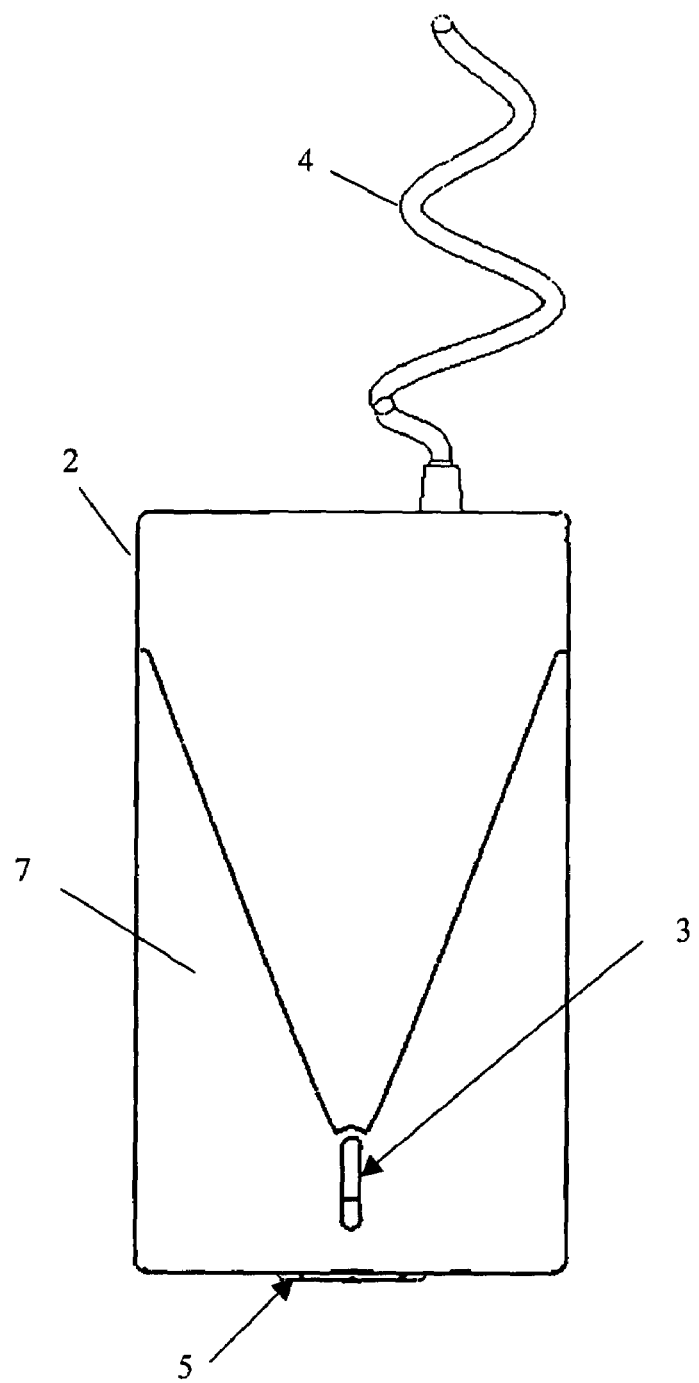
FIG. 2 is top orthogonal view of the computerized bank of the present invention.
Figure 3:
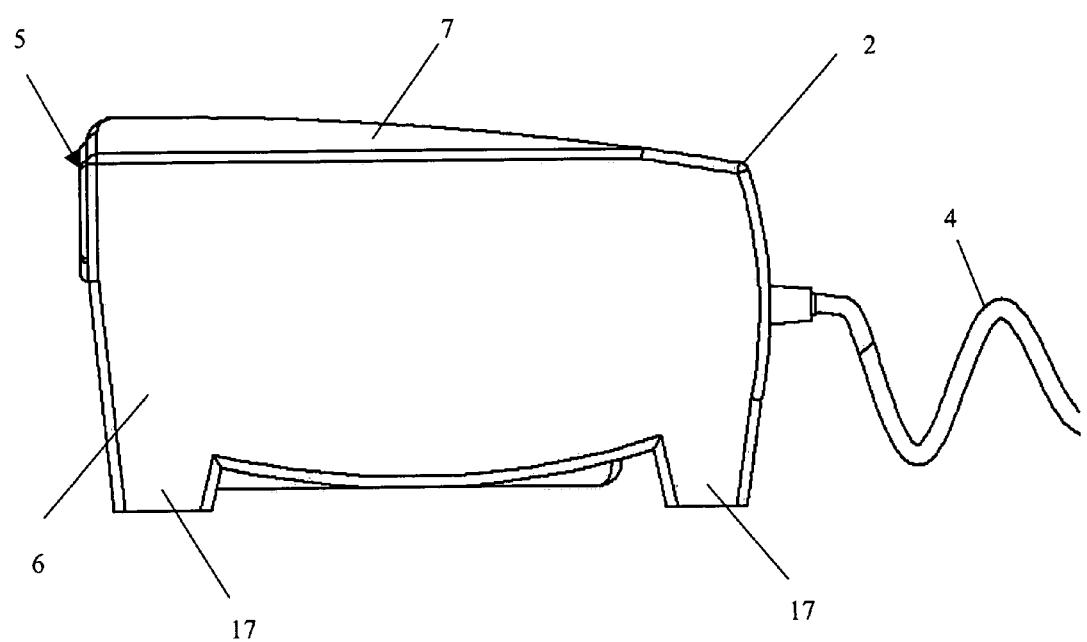
FIG. 3 is side orthogonal view of the computerized bank of the present invention.
Figure 4:
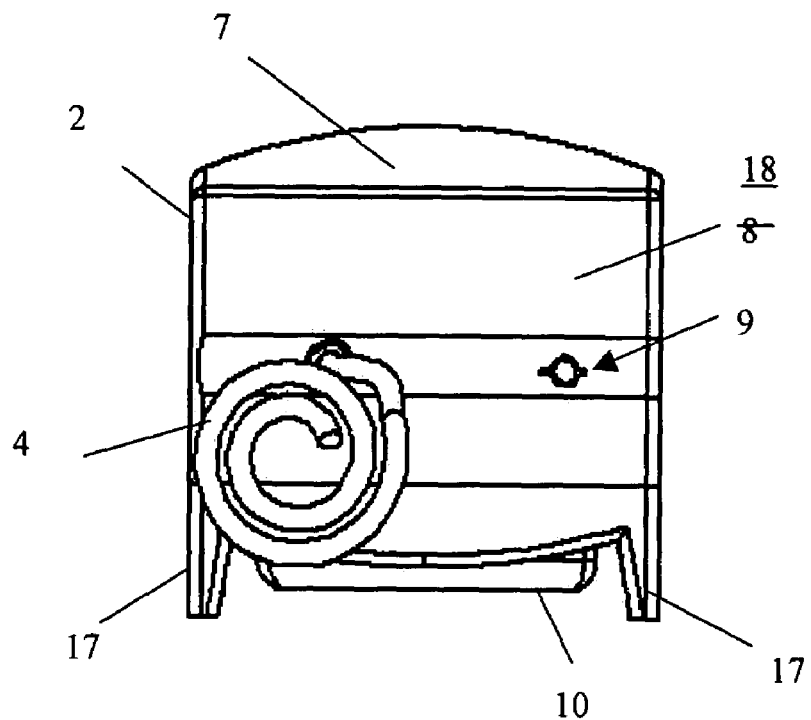
FIG. 4 is back orthogonal view of the computerized bank of the present invention.

Now referring to FIGS. 2-4, the exterior surface design and components are illustrated for the computerized bank of the present invention. The top surface 7 is also comprised of a coin slot 3 where coins can be deposited into the bank 1. The front surface 8 contains a control panel 5 similar in appears to a pig's snout, with a circular shape defined by a plurality semi-circular shaped buttons 19. The side surfaces 6 are tapered at the bottom to simulate the belly of an actual pig, while the back surface 18 is where the cord 4 attaches to the case 2. The cord 4 contains a plurality of spirals, again in similarity to an actual pig. The back surface 18 also contains a locking mechanism 9 for securing the money reservoir 10 within the internal cavity 16 to avoid removal by minors or other unauthorized users.

Figure 5:
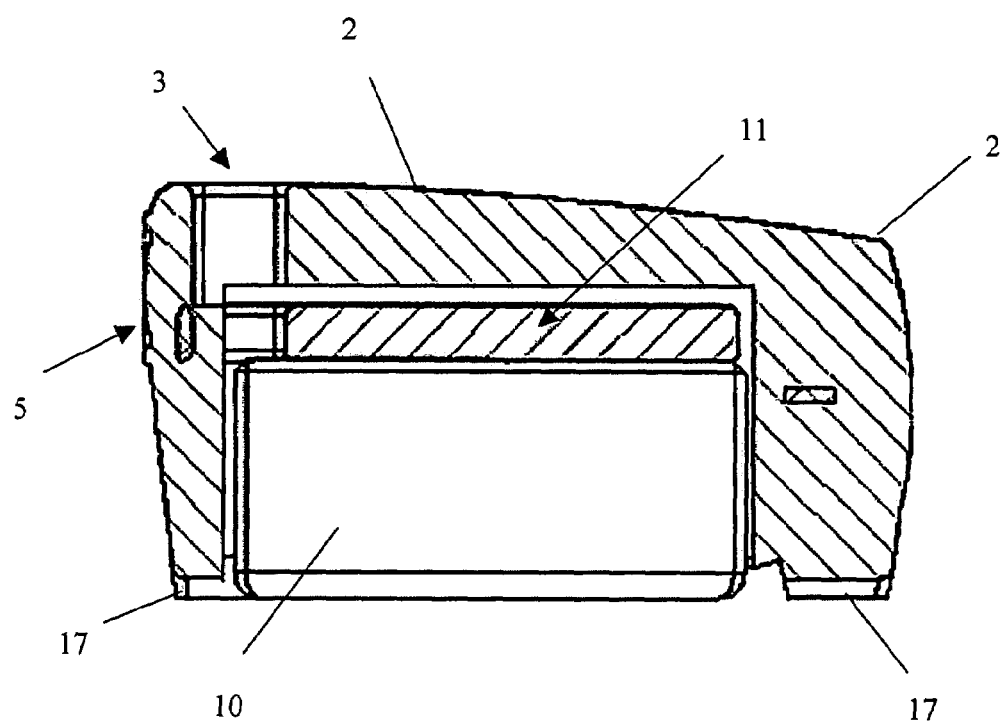
FIG. 5 is a cut away view of the computerized bank of the present invention.
Figure 6:
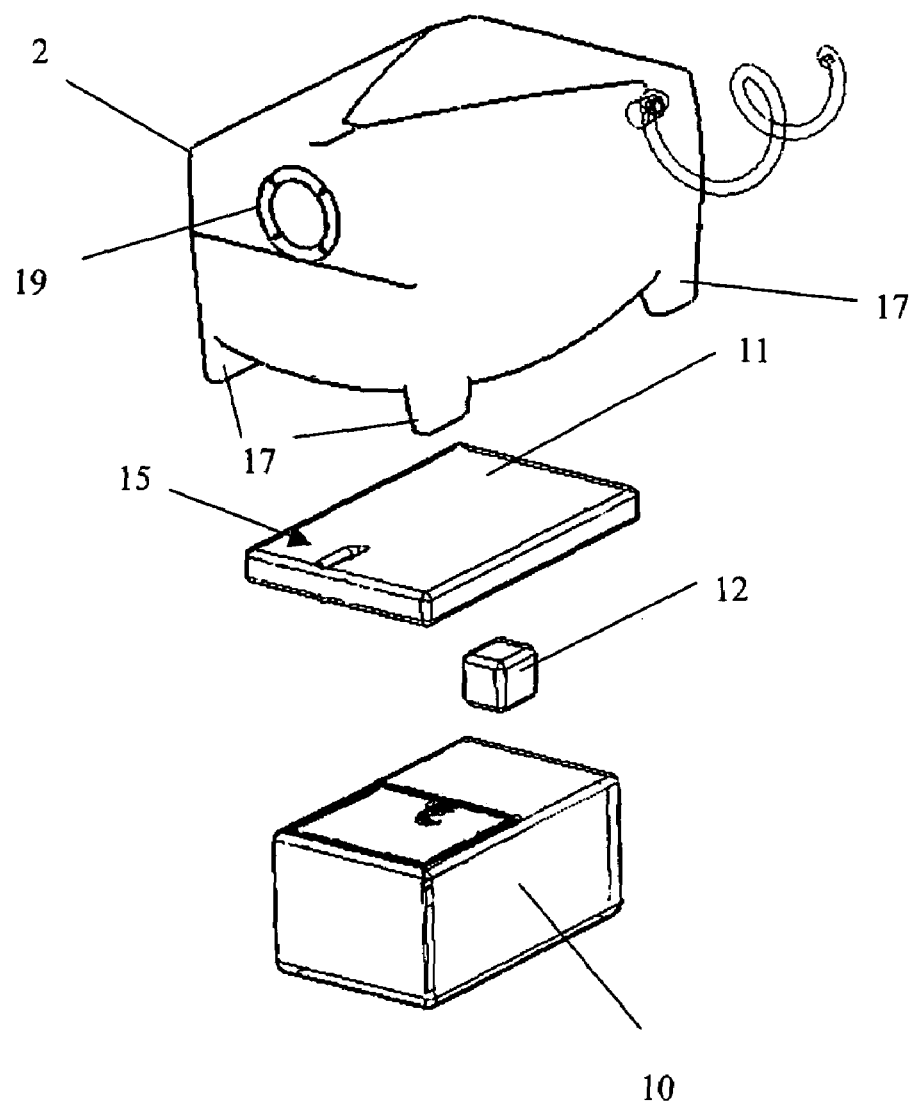
FIG. 6 is an exploded view of the computerized bank of the present invention illustrating its main components.

Now referring to FIGS. 5 and 6 cutaway and exploded views revel the location and position of each internal device contain within the internal cavity 16 of the case 2. Coins are placed in the coin slot 3 where they then fall into a slot 15 on the money sorter and counter 11 and are then finally deposited into the money reservoir 10. The money reservoir 10 is locked to the internal cavity 16 of the case 2 via the locking mechanism 12 and the money sorter and counter 11 is manipulated by the control panel 5. Although not shown, it is well known in the art that coin and combination coin and bill sorters are available and used in various devices. Thus, it would be obvious to one of ordinary skill in the art to use either a coin sorter or a combination coin and bill sorter in the device of the present invention.

Figure 7:
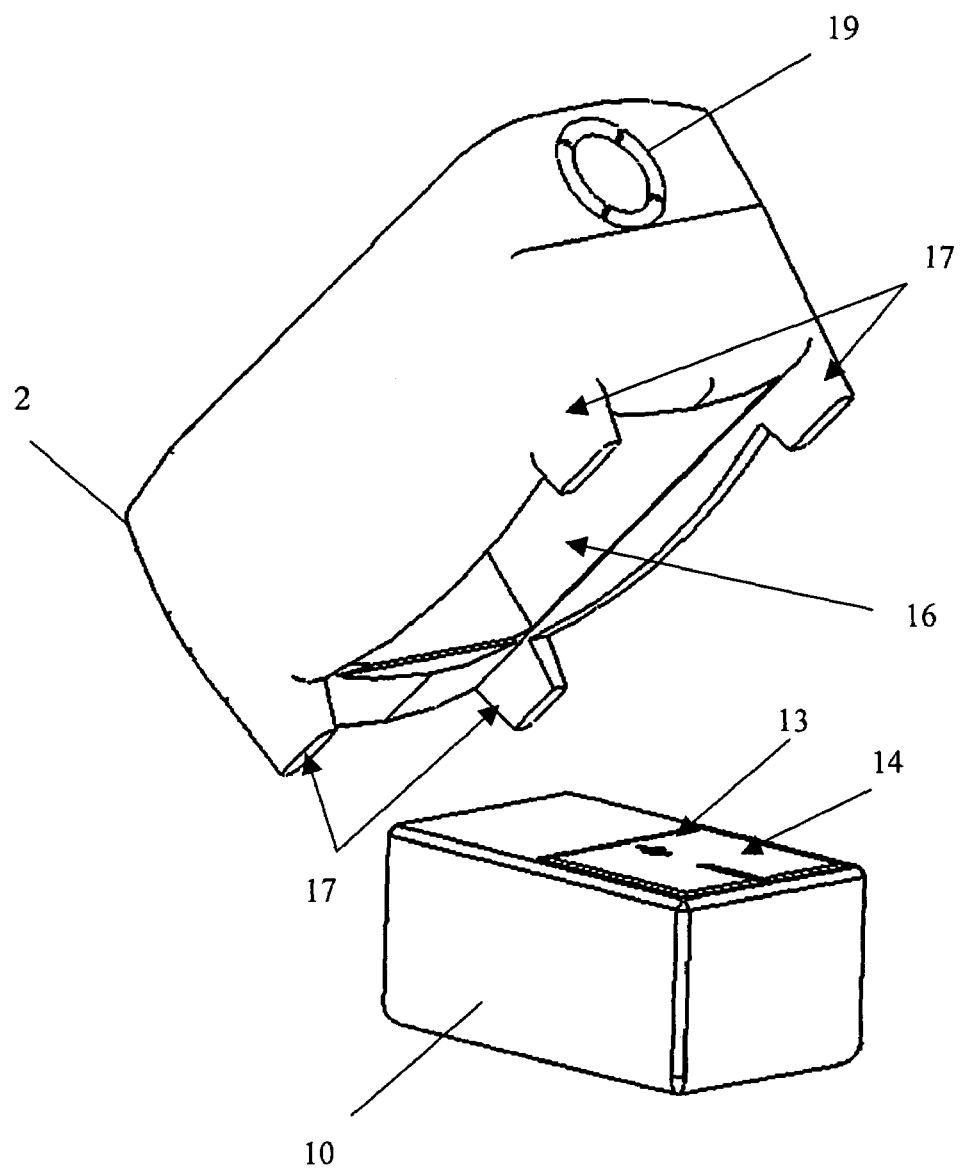
FIG. 7 is an expanded view of illustrating how the money reservoir and case of the computerized bank of the present invention are combined and separated.
Figure 8:
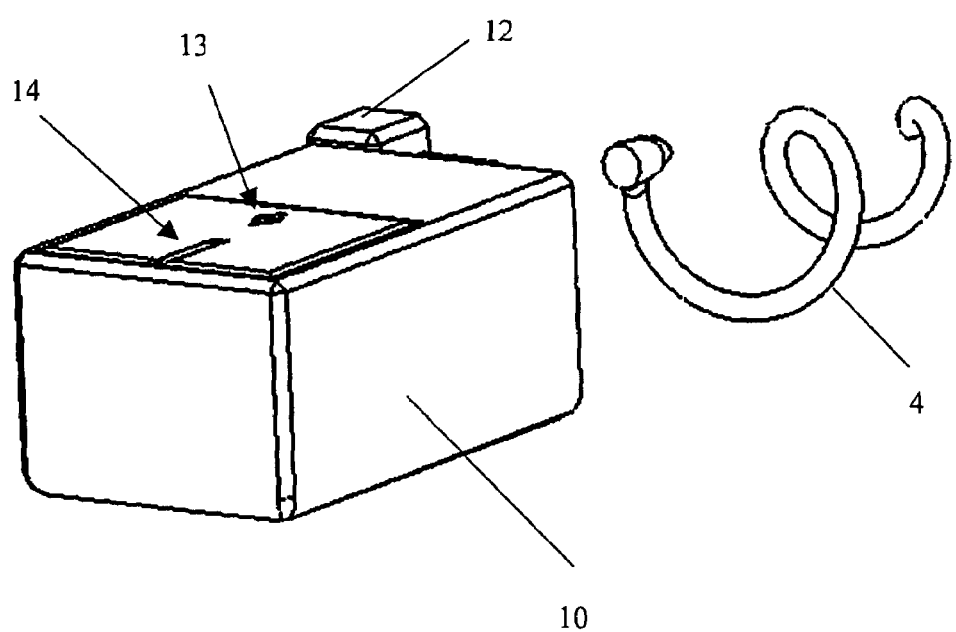
FIG. 8 is an expanded view of the money reservoir, locking device, and cord of the computerized bank of the present invention.
Figure 9:
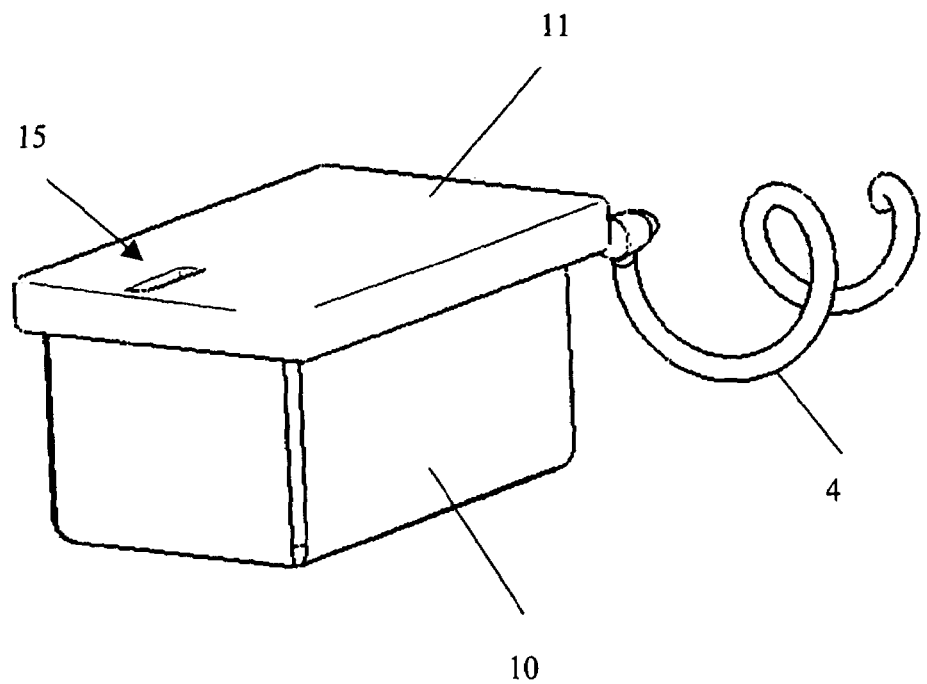
FIG. 9 is a perspective view of the money reservoir, electronic coin sorting means and cord of the computerized bank of the present invention.

Referring to FIGS. 7-9, the money reservoir 10 is removable from the internal cavity 16 of the case 2 via release of the locking mechanism 12. With the money reservoir 10 removed, the coins are still secured within the money reservoir 10 by a second locking mechanism 13. The money reservoir 10 consists of a strong metal or plastic material that is secure and provides access to via a locking mechanism 13. The money reservoir 10 also contains a slot 14 for the deposit of coins as they are expelled from the money sorter and counter 11.

The money reservoir 10 is "keyed" and can only be opened by the local bank, where account is held, or by parents, if the account is held by a minor. If the money reservoir 10 is emptied at prior to deposit, credits, and interest recorded in the local bank's online banking system are lost and can only be resumed after an equal deposit is made at the local bank.

Referring specifically to FIG. 9, the money reservoir 10, when secured within the internal cavity 16 of the case 2 via the locking mechanism 12, which can be keyed or coded, engages the money sorter and counter 11. The money sorter and counter 11 can be either mechanical or electronic is its method. In a preferred embodiment, the money sorter and counter 11 is an electronic version that is further comprised of internal electronics for enabling the control panel 5 and connection to a computer or wireless network for interaction with an online computer banking system. In an embodiment utilizing an electronic money sorter and counter 11 the cord previously described provides power to the device. Additionally, the cord may include USB cables for connection to a computer or an antenna for connection to a wireless network.

In one embodiment the computerized bank 1 taught by the present invention plugs into a USB portal on a computer and synchronizes with an individual's account at a local bank through the bank's on-line banking system.

In a second embodiment, a wireless computerized bank 1 utilizing a wireless network connection taught by the present invention can be placed anywhere about the home and can synchronize remotely. Change can be deposited within the computerized bank in any time or any place when in range of the wireless network.

In a third embodiment, a memory stick is removeably concealed within the case 2 of the bank device and is attached to the money sorter and counter 11. The memory stick collects and stores deposit information such as amount, date, time, and user. When the reservoir 10 is removed for delivery to the local bank, the user also removes the memory stick for delivery to the local bank. Delivery of both the memory stick and reservoir 10 then provides the bank with the deposit information and the currency.

Method of Use for the Computerized Banking

Figure 10:
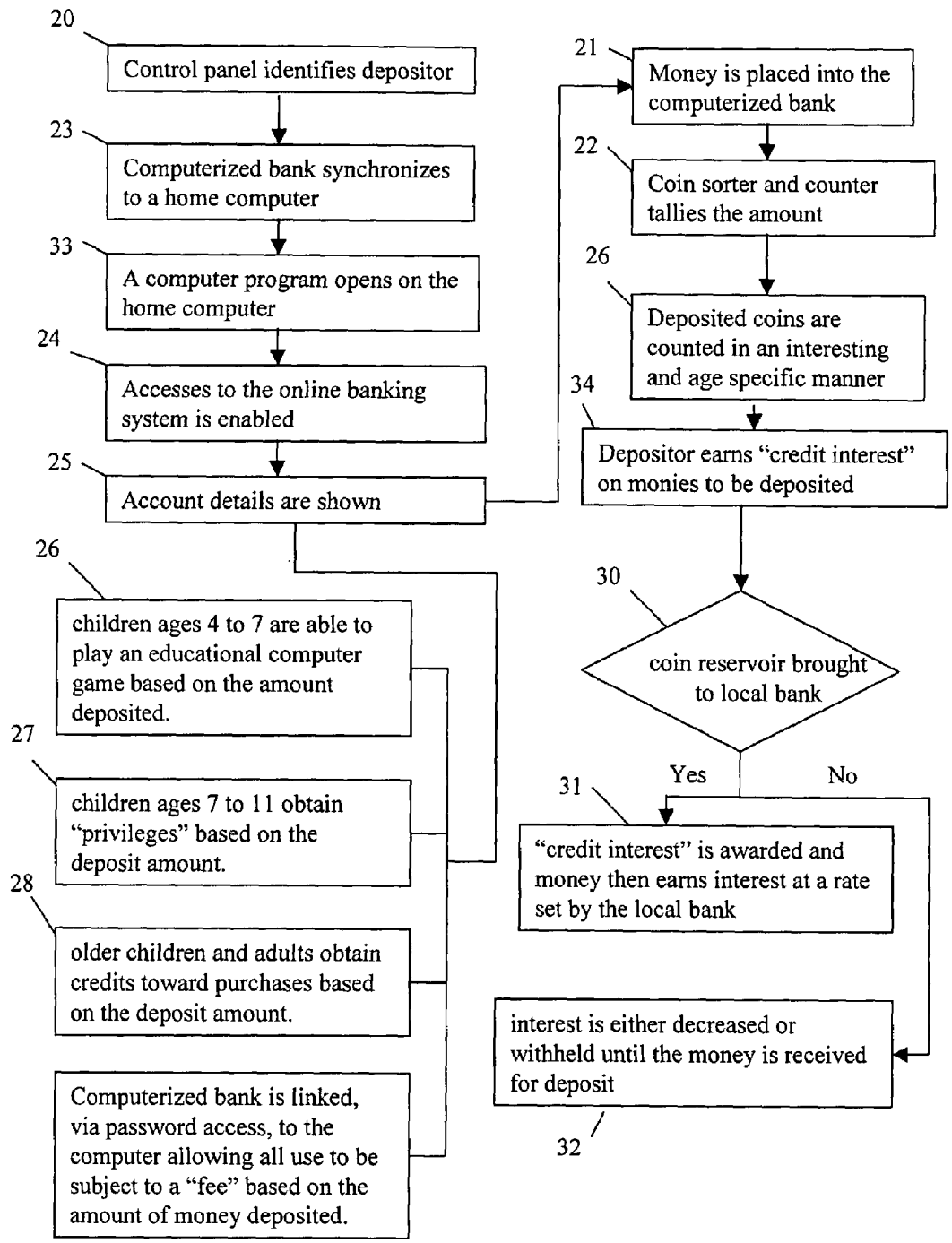
FIG. 10 is a flow showing the method of use of the computerized bank of the present invention and its connection to and interaction with an online banking system.

Now referring to FIG. 10 the control panel 5 on the computerized bank 1 provides means for each depositor to keep track of their individual deposits. In a first step, a depositor uses the control panel 5 to identify themselves to the computerized bank 20. Thus, there is no need for multiple computerized banks in one location or home.

As money is placed into the computerized bank 21 the money sorter and counter tallies the amount 22 and following process occurs. The computerized bank synchronized to a home computer 23 and accesses the online banking system tied to the local or it's main operations 24. A computer program opens on the home computer 23 that counts the deposited coins in an interesting and age specific manner. The computer program may show totals, interest earned, college savings balance, or any number of accounts and account details 25.

A depositor earns "credit interest" 29 on monies to be deposited provided that the computer bank's money reservoir 10 is brought to the local bank on a periodic basis or as required by the local bank and monies are deposited 30.

Once money is truly counted and deposited 30, the "credit interest" is awarded and money then earns interest at a rate set by the local bank 31. If money is not brought in as required, interest is either decreased or withheld until the money is received for deposit 32. Additionally, a depositor's account can be a college savings account so that change lying around the house is put to real use and children feel they are contributing to their educational fund.

In a first display embodiment 26, children ages 4 to 7 are allowed a certain amount of time to play an educational computer game based on the amount deposited. The games are accessed through the bank's web site directly or through a separate vendor. These games tie into saving and financial education as it relates to the child, adolescent, adult.

In a second display embodiment 27, children ages 7 to 11 may alternatively be allowed to obtain "privileges" determined by their parents and earned, based on savings amount. For example, after a certain savings milestone is reached, a voucher for "One half-hour of TV viewing" or similar privilege is awarded.

In a third display embodiment 28, children and adults may, by depositing a certain amount, buy credits toward purchases. For example credits may be given in the amount equal to deposits for the future purchase of online music or movies or purchase from participating online stores and retailers. To control the device, children and parents can access a webster on their home computer and, with a drop down menu, determine the awards or create their own. For example to change a child's password or modify the credits a child or parent could access either a program on their home computer that interacts with the device without being connected to the bank accounts. Alternatively, the bank's web based program and interface could incorporate this control feature, which would be accessed from a home computer or portable electronic device with Internet access.

In a fourth display embodiment 29, the computerized bank is linked to via password access to the computer thereby allowing all computer use to be subject to a "fee" based on the amount of money deposited. Recreational use of computer would then be "charged" based on deposits. Parents can override this feature when a child needs to do homework, if parents don't desire this option, or any user must perform work.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A computerized banking system comprising:
   a computer;
   a bank shaped like an animal with a hollow body consisting of six sides; a top surface, two side surfaces, a front surface, a back surface, and a hollow bottom body cavity supported by a plurality of legs;
   said bank further comprising:
   a locking reservoir removeably secured within the hollow body cavity;

a corded connection between said computer and reservoir;

said locking reservoir providing means to collect money wherein said reservoir is removable from the computerized banking system;

said hollow body and locking reservoir have corresponding and complementary slots for monetary deposits;

said reservoir has security means such that it can only be opened and emptied by a local bank;

a bank account with on-line or web-based banking;

said bank and web-based bank account linked via a multi-user network;

said bank device further comprising a money sorter as means for counting the depositing of coins and bills into the reservoir, said computer tracking the amount of the deposit, updating the bank account and interacting with other software on the local computer to provide programs for interaction with a user; and said software provides interactive content based on interest, age, and learning concepts.

2. The computerized banking system of claim 1 wherein:

the top surface is also comprised of a money slot;

the front surface contains a control panel in the shape of a pig's snout;

said control panel is further comprised of a circular shape defined by a plurality of semi-circular shaped buttons;

the side surfaces are tapered at the bottom to simulate the belly of an actual pig;

a cord containing a plurality of spirals is attached to the back surface; and said back surface also contains a locking mechanism for securing the money reservoir within the hollow body cavity to avoid removal by minors or other unauthorized users.

3. The computerized banking system of claim 2 wherein a wireless connection between said computer and reservoir is utilized for connectivity and a battery is included to power the money sorter and counter.

4. The computerized banking system of claim 3 wherein the bank utilizes a wireless network connection to connect to the computer.

5. The computerized banking system of claim 2 wherein a corded connection between said computer and reservoir is utilized for connectivity and to power the money sorter and counter.

6. The computerized banking system of claim 5 wherein the bank plugs into a USB portal on a computer and synchronizes with an individual's account at a local bank through the bank's on-line banking system.

7. The computerized banking system of claim 2 wherein said top surface and locking reservoir have corresponding money slots for coin deposits.

8. The computerized banking system of claim 2 wherein said top surface and locking reservoir have corresponding money slots for coin and bill deposits.

9. The computerized banking system of claim 1 wherein the money reservoir is keyed and can only be opened by the local bank.

10. The computerized banking system of claim 1 wherein the money sorter and counter is either mechanical or electronic.

11. The computerized banking system of claim 10 wherein the money sorter and counter is an electronic version that is further comprised of internal electronics for enabling the control panel and connection to a computer or wireless network for interaction with an online computer banking system.

12. The computerized banking system of claim 1 further comprising a memory stick which is removeably attached to the money sorter and counter, said memory stick collects and stores deposit information.

* * * * *